US010393288B2

(12) United States Patent
Roodenburg et al.

(10) Patent No.: US 10,393,288 B2
(45) Date of Patent: *Aug. 27, 2019

(54) MARINE REEL LAY METHOD PIPELINE INSTALLATION SYSTEM AND METHODS

(71) Applicant: ITREC B.V., Schiedam (NL)

(72) Inventors: Joop Roodenburg, Schiedam (NL); Terence Willem August Vehmeijer, Schiedam (NL); Hendrik Hessels, Schiedam (NL)

(73) Assignee: ITREC B.V., Schiedam (NL)

(*) Notice: Subject to any disclaimer, the term of this patent is extended or adjusted under 35 U.S.C. 154(b) by 0 days.

This patent is subject to a terminal disclaimer.

(21) Appl. No.: 16/172,448

(22) Filed: Oct. 26, 2018

(65) Prior Publication Data

US 2019/0063638 A1 Feb. 28, 2019

Related U.S. Application Data

(62) Division of application No. 15/569,952, filed as application No. PCT/NL2015/050755 on Oct. 29, 2015, now Pat. No. 10,139,013.

(30) Foreign Application Priority Data

Apr. 28, 2015 (WO) ................ PCT/NL2015/050285

(51) Int. Cl.
*F16L 1/16* (2006.01)
*F16L 1/20* (2006.01)
(Continued)

(52) U.S. Cl.
CPC ................ *F16L 1/16* (2013.01); *B63B 35/03* (2013.01); *E21B 19/006* (2013.01);
(Continued)

(58) Field of Classification Search
CPC .............. F16L 1/207; F16L 1/202; F16L 1/16
(Continued)

(56) References Cited

U.S. PATENT DOCUMENTS 1,696,163 A * 12/1928 Hathaway .............. D03D 39/06 139/10
4,367,055 A * 1/1983 Gentry .................. E21B 17/015 166/345
(Continued)

FOREIGN PATENT DOCUMENTS

WO WO 2007/108673 A1 9/2007
WO WO 2012/091556 A1 7/2012
(Continued)

OTHER PUBLICATIONS

International Search Report, issued in PCT/NL2015/050755, dated May 23, 2016.
(Continued)

*Primary Examiner* — Benjamin F Fiorello
*Assistant Examiner* — Edwin J Toledo-Duran
(74) *Attorney, Agent, or Firm* — Birch, Stewart, Kolasch & Birch, LLP

(57) ABSTRACT

An improved system and method for laying on the seabed a pipeline and/or installing a subsea riser including one or more accessories are disclosed. In the system, a trolley rail for an auxiliary trolley is provided which includes a retractable trolley rail part supported by the tower via an associated mobile rail support assembly. Displacement of the retractable trolley rail part together with the auxiliary trolley when arranged on said retractable trolley rail part with respect to the tower is allowed, between an active position, wherein the auxiliary trolley is positioned to engage on an accessory in the firing line, and a retracted and non-operable position wherein a clear envelope about the firing line is created.

20 Claims, 12 Drawing Sheets

Figure 1A:
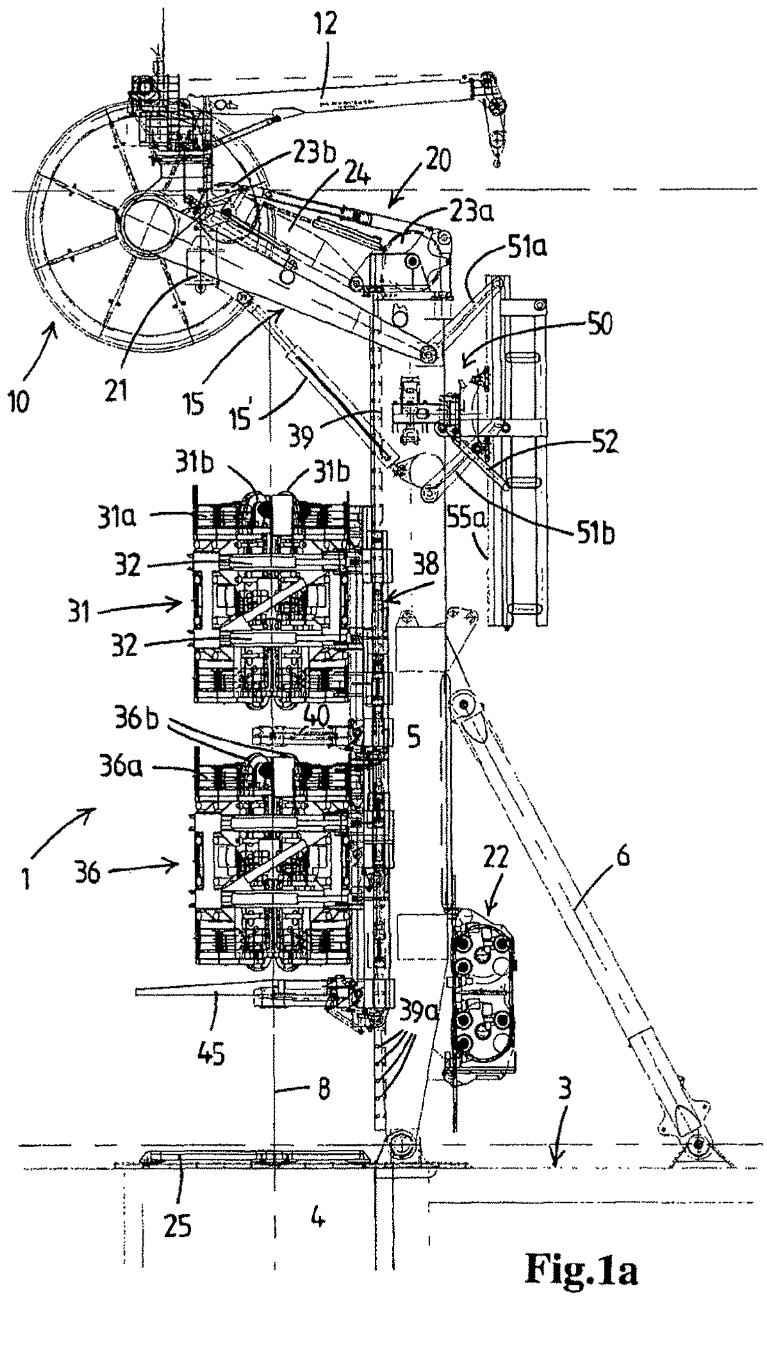

(51) Int. Cl.
*F16L 1/23* (2006.01)
*B63B 35/03* (2006.01)
*E21B 19/22* (2006.01)
*E21B 19/00* (2006.01)
*E21B 19/06* (2006.01)
*E21B 19/24* (2006.01)
*E21B 15/02* (2006.01)

(52) U.S. Cl.
CPC ............ *E21B 19/008* (2013.01); *E21B 19/06* (2013.01); *E21B 19/22* (2013.01); *E21B 19/24* (2013.01); *F16L 1/20* (2013.01); *F16L 1/203* (2013.01); *F16L 1/23* (2013.01); *E21B 15/02* (2013.01)

(58) Field of Classification Search
USPC ...................................... 405/168.3, 166, 158
See application file for complete search history.

(56) References Cited

U.S. PATENT DOCUMENTS 4,436,048 A * 3/1984 Gentry .................. B63B 21/508 114/230.12
4,448,568 A * 5/1984 Gentry .................. B63B 22/021 166/345
4,793,737 A * 12/1988 Shotbolt ............... E21B 17/015 166/343
5,181,798 A * 1/1993 Gilchrist, Jr. ........... F16L 1/225 405/156
6,056,478 A * 5/2000 Martin .................... F16L 1/225 405/158
6,149,347 A * 11/2000 Scott ......................... F16L 1/19 405/158
6,352,388 B1 * 3/2002 Seguin .................... B63B 35/03 405/166
6,361,250 B1 * 3/2002 de Varax ................... F16L 1/19 405/158
6,524,030 B1 * 2/2003 Giovannini ............. B63B 35/03 405/166
6,595,725 B1 * 7/2003 Shotbolt ................. B63B 22/04 166/345
6,871,609 B2 * 3/2005 Roodenburg ........... B63B 15/00 114/201 R
7,451,821 B2 * 11/2008 Rashid .................... B63B 27/02 166/351
9,759,351 B2 * 9/2017 Feijen ....................... F16L 1/16
9,835,268 B2 * 12/2017 Roodenburg ............. F16L 1/19
2002/0009333 A1 * 1/2002 Willis ..................... F16L 1/207 405/158
2002/0021942 A1 * 2/2002 Willis ....................... F16L 1/19 405/166
2002/0159839 A1 * 10/2002 Frijns ........................ F16L 1/19 405/166
2003/0231931 A1 * 12/2003 Moszkowski ............. F16L 1/19 405/158
2004/0089215 A1 * 5/2004 Roodenburg ........... B63B 15/00 114/201 R
2005/0109724 A1 * 5/2005 Frumau ................... B63B 27/10 212/307
2005/0207849 A1 * 9/2005 Roodenburg ........... E21B 19/09 405/166
2006/0275102 A1 * 12/2006 Willis ....................... F16L 1/19 414/138.4
2007/0189857 A1 * 8/2007 Vergouw .................. F16L 1/19 405/166
2007/0258772 A1 * 11/2007 Bursaux .................. F16L 1/203 405/166
2008/0170911 A1 * 7/2008 Snowdon .................. F16L 1/18 405/166
2010/0300697 A1 * 12/2010 Wijning .................. E21B 17/20 166/352
2011/0005764 A1 * 1/2011 Bekkevold ............ E21B 43/013 166/344
2011/0103894 A1 * 5/2011 Feijen ....................... F16L 1/19 405/166
2011/0123273 A1 * 5/2011 Feijen ....................... F16L 1/16 405/166
2012/0103623 A1 * 5/2012 Wijning ................ E21B 19/146 166/352
2012/0183357 A1 * 7/2012 Randrianarivony ...... F16L 1/19 405/166
2012/0195716 A1 * 8/2012 Nouwens .............. E21B 19/155 414/22.55
2015/0362091 A1 * 12/2015 Roodenburg ............. F16L 1/19 405/168.3
2017/0051847 A1 * 2/2017 Roodenburg ............. F16L 1/20
2017/0138508 A1 * 5/2017 Roodenburg ............. F16L 1/19

FOREIGN PATENT DOCUMENTS

WO WO 2014/120004 A1 8/2014
WO WO 2014/148907 A1 9/2014

OTHER PUBLICATIONS

Written Opinion of the International Searching Authority, issued in PCT/NL2015/050755, dated May 23, 2016.

* cited by examiner

MARINE REEL LAY METHOD PIPELINE INSTALLATION SYSTEM AND METHODS

This application is a Divisional of copending application Ser. No. 15/569,952, filed on Oct. 27, 2017, which is the National Phase under 35 U.S.C. § 371 of International Application No. PCT/NL2015/050755, filed on Oct. 29, 2015, which claims the benefit under 35 U.S.C. § 119(a) to PCT Application No. PCT/NL2015/050285, filed in Netherlands on Apr. 28, 2015, all of which are hereby expressly incorporated by reference into the present application.

The present invention relates to the field of marine reel lay method pipeline installation.

From the prior art reel lay systems are known for laying on the seabed a pipeline and/or installing a subsea riser including one or more accessories. An example of a marine reel lay pipelaying system of the same applicant is disclosed in WO2014/120004. In the known systems the tensioners are operable between an active pipelaying mode, wherein the firing line extends through the tensioner frame and between the tracks, so that the tracks are positioned to engage the pipeline and to support the pipeline in the firing line, and a retracted mode wherein a clear envelope is created about the firing line. In this retracted mode of the one or more tensioners, an auxiliary trolley is movable along a vertical trolley rail which is adapted to engage on an accessory in the firing line.

The aim of the present invention is to provide an improved marine reel lay method pipeline installation system, or at least an alternative system. The invention further aims to provide improved marine reel lay methods.

This aim is achieved in that according to the present invention, the trolley rail comprises a retractable trolley rail part supported by the tower via an associated mobile rail support assembly, which is adapted to allow for displacement of the retractable trolley rail part together with the auxiliary trolley when arranged on said retractable trolley rail part with respect to the tower between an active position, wherein the auxiliary trolley is positioned to engage on an accessory in the firing line, and a retracted and non-operable position wherein a clear envelope about the firing line is created.

As the auxiliary trolley may be a voluminous component, it is advantageous to be able to clear the firing line by removing the auxiliary trolley together with a retractable trolley rail part, e.g. during pipelaying. Possibly, the removal is also advantageous during other operations related to pipelaying and/or subsea riser installation. For example during the handling of extremely large accessories into the firing line, it may be advantageous to first position the accessory and thereafter position the auxiliary trolley into the firing line, to engage on the accessory.

An advantage of such a marine reel lay method pipeline installation vessel according to the invention is that the auxiliary trolley and rail facilitates end connector handling. It is further advantageous during well intervention, e.g. if pipelaying is alternated by lowering special items. Another possible advantage of the presence of an auxiliary trolley and rail is that the pipeline launch tower may also be applied for pipelaying in a J-lay method.

According to the invention, accessories are included to the pipeline and/or subsea riser. E.g. accessories at the leading or trailing end of a pipeline, and pipelines with end connectors at the leading and/or trailing end. Examples of accessories are Pipeline End Terminals (PLET's) and/or intermediate Pipeline accessories (ILS), e.g. having one or more valves and/or one or more pipeline branching devices, e.g. with one or more pipeline tie-in devices, connectors, initiation fittings, inline SLED assemblies, inline manifolds, pipe valves, tee assemblies with their supporting structures and mud-mats. Hence, it is both conceivable that the accessory, e.g. an end fitting, is in the pipeline, and that the accessory, e.g. a PLET, is to be provided into the firing line and attached to the pipeline. To this end, in embodiments an accessory handling device is provided, which is adapted to position the accessory in an accessory position in the firing line, preferably between the hang off device and the A&R sheave arrangement. The accessory may be positioned into the firing line below the one or more tensioners, but it is also conceivable that the accessory is provided above the one or more tensioners.

The auxiliary trolley is adapted to engage on an accessory in the firing line. For example, the auxiliary trolley guides the accessory. In another exemplary embodiment, the auxiliary trolley supports the accessory. Possibly, the accessory is mounted to the auxiliary trolley. The auxiliary trolley is in embodiments provided with a clamp, e.g. a collar clamp, or a retainer to engage an accessory, pipeline or pipe section or pipe portion, e.g. a pipe portion mounted to an accessory. Advantageously, the auxiliary trolley supports the weight of the accessory, and preferably also that of the pipeline.

Advantageously, as known from the same applicant, the auxiliary trolley is adapted to support the weight of the launched pipeline. In WO2012091556 of the same applicant, an auxiliary trolley is described, here a embodied as a travelling clamp, which is adapted to support the weight of the launched pipeline and which is movable along a rail in the pipeline launch trajectory when the one or more tensioner frames are in the retracted non-operable mode. In embodiments, the auxiliary trolley is provided with wheels engaging on the rails. For example, the auxiliary trolley is provided with four wheels at its corners, two wheels engaging one rail, and the opposed two wheels engaging an opposed rail. It is also conceivable that the auxiliary trolley is provided with multiple bogies, e.g. bogies at the end parts of the auxiliary trolley, wherein each bogie is provided with wheels engaging on the rails.

The auxiliary trolley is movable along a vertical trolley rail. Advantageously, an auxiliary trolley displacement drive is provided. In embodiments, the auxiliary trolley displacement drive comprises a cable and winch, e.g. the A&R cable and winch. Possibly, the auxiliary trolley comprises an A&R connector allowing the A&R cable to be connected to the auxiliary trolley, e.g. at a position above the uppermost tensioner, allowing the auxiliary trolley to move up and down along the vertical trolley rail.

Advantageously, the vertical trolley rail extends between a position below the tensioners, e.g. adjacent the hang off clamp, and a position adjacent the pipeline guide, such that the auxiliary trolley is movable from a position above the uppermost tensioner to a position below the lowermost tensioner. In embodiments, the vertical trolley rail extends over essentially the entire length of the pipeline launch tower.

In a particular advantageous embodiment, the vertical trolley rail extends to a position below the hang off clamp, possibly into a moonpool of the system. Hence, it is possible to engage accessories all the way into the moonpool.

According to the invention, part of the trolley rail retractable. This may e.g. be a part of the trolley rail provided above or below the tensioners. Accordingly, a clear envelope about the firing line above and/or below the tensioners is created, e.g. to receive accessories. In addition, trolley rail parts may be supported by the tensioner, referred to as tensioner trolley rail parts. In embodiments, the trolley rail further comprises tower trolley rail parts, e.g. provided below or above the tensioners as well, which are supported by the tower (but not retractable). For example a tower trolley rail part is supported below the one or more tensioners, in the vicinity of and possibly until a position below the hang off device, such that the auxiliary trolley is movable to a position below the lowermost tensioner. A possible moonpool trolley rail part extending into the moonpool may be supported by the vessel. It is also conceivable that a support structure is provided to support a part of the trolley rail.

Advantageously, a fixation device is provided to fixate the auxiliary trolley to the retractable trolley rail part. As the auxiliary trolley is intended to be movable along the trolley rail, such a fixation device prevents the auxiliary trolley to move along the retractable trolley rail part.

According to the invention, the trolley rail comprises a retractable trolley rail part supported by the tower via an associated mobile rail support assembly. In embodiments, the mobile rail support assembly comprises parallel bar linkage, which can e.g. be actuated via hydraulic cylinders.

The marine reel lay method pipeline installation system according to the present invention is a system for laying an offshore pipeline and/or installing a subsea riser, said system at least being adapted to carry out the reel lay method. The system is suitable for laying flexible pipelines, as well as rigid pipelines. The present invention also relates to the installation of pipeline in the form of a subsea riser, e.g. between a wellhead and a vessel, drilling/production facility, etc. The system may also be suitable for laying pipe sections in a J-lay mode. According to the invention, the system is suitable for installing accessories in or onto a pipeline. The pipeline that has been laid may be referred to as the launched pipeline, which has a weight.

Preferably, the system according to the invention comprises a vessel, but alternatively the system could also be provided on a platform. The vessel is e.g. a monohull vessel, a twin-hull vessel or a semi-submersible vessel.

The system comprises one or more pipeline storage reels for storage of the pipeline to be laid and/or installed. The storage reels may be provided on a vessel. These may be storage reels having a vertical axis, such as carousels, or having a horizontal axis, such as baskets. It is conceivable that the reels are stored on deck of the vessel, but it is also possible to store the one or more reels in the hull of the vessel. Reel supply vessels may be provided near the vessel, to supply reels provided with new pipelines to the vessel, to replace the empty reels of which the pipeline has been launched.

The marine pipeline installation system according to the invention is also provided with a pipeline launch tower, which is adapted to launch the pipeline in a firing line along said tower into the sea, in the direction of the seabed. The firing line extends parallel with the tower, preferably adjacent the tower. The firing line is sometimes also referred to as the pipeline launch trajectory. It is also conceivable, in particular when the tower is of a derrick-type construction, that the firing line extends in the tower. In an embodiment where the marine pipeline installation system comprises a vessel having a moonpool, such a tower is often, but not necessarily, placed adjacent or over the moonpool of the vessel, and the marine pipelaying system is adapted to lay pipeline through said moonpool. It is also possible to place the tower at another suitable location, e.g. at the stern of the vessel. In general the term tower here refers to a raised structure on the vessel. In embodiments, the pipeline launch tower is embodied as a single column. Alternatively, pipeline launch towers are known comprising two vertical leg members, possibly interconnected by cross beams. In a possible embodiment, the pipeline launch tower is mounted pivotably on said vessel to adjust inclination of the tower.

A pipeline guide is provided at an elevated position, which pipeline guide is adapted to guide said pipeline from a storage reel over the pipeline guide into the firing line. Preferably the pipeline guide is supported at an elevated position by the tower. The pipeline guide provides a curved path for guiding the pipeline. Known pipeline guides include a large diameter pipeline guide wheel or a semi-circular guide structure, e.g. provided with rollers or chains. Possibly, the pipeline guide is provided moveable, e.g. retractable as described in WO2012/091556, or via a mechanism as described by the applicant in WO2014/148907.

Advantageously, the pipeline guide is movably supported via a guide frame by the tower. The guide frame enables displacement of the pipeline guide between a pipelaying position in which the pipeline guide guides the pipeline from the storage reel over the pipeline guide into the firing line, and a retracted, non-operable position, wherein the pipeline guide has moved away from the firing line. Accordingly, the upper end of the firing line is cleared.

According to the invention, the retractable trolley rail part is displaceable between an active position, wherein the auxiliary trolley is positioned to engage on an accessory in the firing line, and a retracted and non-operable position wherein a clear envelope about the firing line is created. In embodiments, this retractable trolley rail part is provided above one or more tensioners.

In embodiments with a movable pipeline guide positioned at an upper position in the firing line, the active position of the retractable trolley rail part may overlap the pipelaying position of the pipeline guide in the firing line. In such embodiments, the trolley rail with the auxiliary trolley can be positioned in the firing line instead of the pipeline guide.

As common for reel lay pipelaying systems, one or more tensioners are provided, each tensioner comprising a tensioner frame and multiple tracks, supported by said tensioner frame. The one or more tensioners are operable between an active pipelaying mode, wherein the firing line extends through the tensioner frame and between the tracks, so that the tracks are positioned to engage the pipeline and to support the pipeline in the firing line, and a retracted mode wherein a clear envelope is created about the firing line.

In the retracted mode advantageously the entire assembly of tensioner frame and tracks mounted therein is in a retracted position. The thus created clear envelope or clear zone about the firing line allows for the passage of an auxiliary trolley in the firing line. Possibly, a clear envelope is present around the pipeline launch trajectory having a minimum distance to said tensioner of at least one meter, preferably at least 2 meters.

The one or more pipeline tensioners are provided at different heights below the pipeline guide for launching the pipeline. Commonly two tensioners are provided, but versions with one or three tensioners are also known. In practice, a single tensioner can be designed to support a pipeline weight of 50-200 tons, and tensioner capacities of more than 500 tons are also known. Each tensioner comprises a tensioner frame and multiple tracks, also called caterpillars, supported by said tensioner frame. The tracks, often three or four tracks, are adapted for engaging the pipeline and supporting at least part of the weight of the launched pipeline. As is known in the art, the tensioner frame is preferably a frame which forms an ‘annular frame structure' extending around the firing line in normal operation, within which frame structure the tracks are mounted.

The tensioner frame is advantageously supported by the pipeline launch tower. Alternatively, a separate tensioner support structure may be provided. It is known to mount the tracks in a movable manner in said tensioner frame in order to allow for adjustment of the gap between the tracks to accommodate various pipe diameters.

It is known from the prior art to design the tensioner frame 'oversized' with respect to regular pipeline diameters, so that the gap between the tracks can be increased to a large size which allows for the passage of an accessory fitted on (the end of) or in the pipeline.

In an embodiment, as disclosed in WO2007/108673 the tensioner frame is supported via an associated support assembly to the tower, e.g. via a parallel bar linkage, to displace the tensioner frame between the pipelaying mode and the retracted mode in which the entire tensioner frame is retracted from the firing line. Possibly, a tensioner trolley rail part is provided on the tensioner. In an embodiment, the tensioner trolley rail part is provided on the outside of the frame of the tensioner, such that in the retracted mode of the tensioner, wherein the frame is retracted and a clear envelope about the firing line is created, the tensioner trolley rail part on the outside of the frame is provided adjacent the firing line allowing the auxiliary trolley to move along the trolley rail and engage on the accessory in the firing line.

The present invention also relates to a system according to the preamble of claim 1, wherein the trolley rail comprises a tensioner trolley rail part supported by the tensioner, e.g. the frame thereof. In embodiments, the tensioner trolley rail part is provided such that in the retracted mode of the tensioner, wherein the frame is retracted and a clear envelope about the firing line is created, the tensioner trolley rail part is provided adjacent the firing line allowing the auxiliary trolley to move along the trolley rail and engage on the accessory in the firing line. In the active pipelaying mode, the tensioner trolley rail part is remote from the firing line.

Possibly, one or more actuators, e.g. hydraulic cylinders, are provided for operating the tensioner between the pipelaying mode and the retracted mode.

In an alternative embodiment, at least one tensioner frame comprises a first segment and a second segment, each including at least one of said tracks, wherein the first and second segment are each mounted pivotable about a respective first and second vertical segment pivot axis to the pipeline launch tower, the segments being pivotable between a pipelaying position in which the tracks are positioned to engage the pipeline; and an open retracted position, wherein the first and second segments are disconnected and separated, thereby creating a clear envelope about the firing line for passage of an accessory, wherein the trolley rail extends between the first and second vertical segment pivot axes. In other words, the segments open and close like arms.

The present invention further relates to a marine reel lay method pipeline installation system according to the preamble of claim 1, wherein at least one tensioner frame comprises a first segment and a second segment each including at least one of said tracks, wherein the first and second segment are each mounted pivotable about a respective first and second vertical segment pivot axis to the pipeline launch tower, the segments being pivotable between a pipelaying position in which the tracks are positioned to engage the pipeline; and an open retracted position, wherein the first and second segments are disconnected and separated, thereby creating a clear envelope about the firing line for passage of an accessory, wherein the trolley rail extends between the first and second vertical segment pivot axes, of which vertical trolley rail at least a part is supported by the pipeline launch tower. The auxiliary trolley is movable along the vertical trolley rail when the first and second segments of the tensioner frame are in the open retracted position.

In embodiments, in the pipelaying position, the segments are conjoined to form an enclosing pipeline annulus.

The two segments are preferably discrete segments, each including at least one track. In an embodiment of a tensioner comprising four tracks, advantageously both the first and second segment each include two tracks.

In the open retracted position of the pivotable segments a lateral opening is created in the tensioner over the entire height thereof, allowing for the lateral introduction and/or removal of a pipeline or other item into the firing line. Hence, two frame parts comprising tracks are mounted movable to enlarge the gap. In embodiments, a free passage diameter of up to 5-6 meters, or even up to 7 meters is possible. For example, this is advantageous for handling a SLOR (Single Line Offset Riser) and/or COR (Concentric Offset Riser), which are very large accessories to be connected to a pipeline, which may even be as large as the pipeline launch tower.

The trolley rail advantageously extends between positions below and above the tensioners. Hence, the trolley rail extends between the first and second vertical segment pivot axes, preferably at least over the entire length of the one or more tensioners, and advantageously also above and/or below the one or more tensioners.

The part of the trolley rail extending at the same height level as the one or more tensioners is advantageously connected to the tower or to the tensioner, e.g. the frame thereof. For example, the trolley rail comprises a tensioner trolley rail part mounted on the tensioner, and a trolley rail part supported by the tower.

The trolley rail part supported by the tower is optionally a retractable trolley rail part, supported via an associated mobile rail support assembly, which is adapted to allow for displacement of the retractable trolley rail part with respect to the tower between an active position, wherein the auxiliary trolley is positioned to engage on an accessory in the firing line, and a retracted and non-operable position.

In embodiments, the retractable trolley rail part is displaceable together with the auxiliary trolley when arranged on said retractable trolley rail part. Preferably the rail support assembly is provided with a fixation device to fixate the auxiliary trolley to the retractable trolley rail part.

In embodiments, the pipeline launch tower comprises two vertical leg members, interconnected via a number of cross beams. Advantageously, the first and second segment of the tensioner frame are mounted pivotable to a distinct vertical leg member.

In embodiments, the first and second segment are each mounted pivotable to a carrier which is displaceable along a tensioner rail which is mounted to the pipeline launch tower, extending parallel to the firing line, allowing the one or more tensioners to be translatable in the firing line, along the pipeline launch tower, and wherein a tensioner displacement drive is provided to support and translate the one or more tensioners along the pipeline launch tower. Such translatable tensioners are described in copending not yet published application PCT/NL2015/050285.

In embodiments, the segments are mounted to distinct carriers. Possibly, the distinct carriers can be driven separately, allowing the segments to be at different heights. In such an embodiment, possibly aligned stops are provided to position the distinct carriers prior to fixing them in a position, such as a pipelaying position, accessory handling position or a parking position.

Preferably, the trolley rail further comprises a carrier trolley rail part mounted on the carrier. For example, when the trolley rail extends between positions below and above the tensioners, the retractable trolley rail part is provided above the tensioners. The part of the trolley rail extending at the height level of the tensioners and between the first and second vertical pivot axes is preferably a carrier trolley rail part mounted on the carrier.

In embodiments, the one or more tensioners are displaceable at least between an upper accessory handling position wherein the one or more tensioners have moved above a lower accessory position and a lower pipelaying position wherein the one or more tensioners at least partially overlap the accessory position.

Alternatively, or in addition, the one or more tensioners are displaceable at least between a lower parking position wherein the one or more tensioners have moved below an end connector entry position and an upper pipelaying position wherein the one or more tensioners at least partially overlap the end connector entry position.

Hence, the tensioner rail may be elongated and extending over (almost) the entire length of the pipeline launch tower. As indicated before, the trolley rail advantageously also extends between a position below and above the tensioners, which may essentially be as long as the pipeline launch tower, or even longer. Hence, in embodiments, the tensioner rail and the vertical trolley rail extend parallel to each other and to the pipeline launch tower, possibly over essentially the same length.

With such an elongated tensioner rail, it is possible that the above-defined upper pipelaying position and/or the upper accessory handling position overlap the active position of the retractable trolley rail part, when the retractable trolley rail part is provided above the one or more tensioners.

With the retractable trolley rail part provided below the one or more tensioners, it is possible that the above-defined lower parking position of the tensioners, or lower pipelaying position of the tensioners, overlap the active position of the retractable trolley rail part.

In embodiments, a tensioner displacement drive is provided. In embodiments, the drive comprises a cable and winch, or alternatively a jackup leg system.

It is conceivable that the A&R cable and winch is applied as tensioner displacement drive. This requires the A&R cable to be alternately connected to the tensioner and to an accessory. E.g. in a method for providing an accessory at the trailing end of a pipeline, the A&R system is first applied to raise the tensioners to the upper accessory handling position, and subsequently used to lower the accessory.

In embodiments, the A&R cable extends from the A&R winch via the tensioner to an A&R sheave provided at an upper position in the firing line. When the position of the tensioner is fixed, the end of the A&R cable is movable in the firing line. In order to move the tensioner, the end of the A&R cable, e.g. a connector or hook, is hauled in adjacent a stop, as a result of which the tensioner will raise and lower upon actuation of the A&R winch.

It is noted that for A&R operations, the A&R cable extends in the firing line. However, during tensioner handling, the firing line should be kept free for the pipeline. E.g. in a method for launching a pipeline with an end connector at its leading end, the pipeline with the end connector is lowered in the firing line. In order to subsequently position the tensioners in the pipelaying position by the tensioner displacement drive, this drive cannot operate in the firing line, occupied by the pipeline. Hence, in order to use the A&R cable for this purpose, the path of the cable needs to be altered. This is commonly achieved by guiding the A&R wire via at least one A&R sheave the tensioner to the A&R sheave arrangement at an upper position in the firing line.

Yet alternatively, a separate dedicated tensioner displacement drive is provided. It is noted that in embodiments, this tensioner displacement drive does not only support the weight of the one or more tensioners, but also the weight of the launched pipeline, supported by the one or more tensioners. As indicated above, the large loads acting on the tensioners require a sturdy design of the tensioners, generally resulting in tensioners with a significant weight, e.g. several hundreds of tons. A single tensioner weighing 300 tons is common. In addition, during pipelaying, the tensioners support the weight of the launched pipeline in the firing line, which may add up to several hundreds of tons, e.g. 600 tons. Hence, the tensioner displacement drive should be well-dimensioned.

In embodiments, the pipeline launch tower and the carrier are provided with cooperating position fixation devices, e.g. pins and slots, to fixate the tensioner with respect to the pipeline launch tower in a position, e.g. an upper accessory handling position, a lower pipelaying position, and a lowermost parking position, also referred to as end connector handling position. In view of this weight, it is advantageous that the tensioner displacement drive does not continuously have to support the tensioners, but that the weight can be transferred to the pipeline launch tower with the installation of the position fixation devices.

A preferred embodiment of the pipeline launch tower used for laying rigid pipes further carries a radius controller and/or one or more straightener tracks for conditioning the rigid pipe at a position upstream of the one or more tensioners.

In embodiments, one or more centralisers are provided to centralise the pipeline in the firing line. Commonly, the centralisers are provided below and adjacent to the one or more tensioners. In embodiments, the one or more centralisers are supported by the tensioner frame, below the tensioner tracks. It is also conceivable that the centralisers are supported directly by the pipeline launch tower.

Advantageously, the one or more centralisers are mounted movable to the tensioner frame or the pipeline launch tower, between a horizontal operational position wherein the centraliser is in the firing line, and a non-operational vertical position wherein centraliser has moved away from the firing line. The cleared firing line is advantageous, e.g. in situations where an accessory is allowed to pass the tensioners. Advantageously, the non-operational position of the centralizer also clears the trolley rail, allowing passage of the auxiliary trolley past the centralizer.

In embodiments, the centraliser is mounted pivotable to the tensioner frame or pipeline launch tower about a horizontal centraliser pivot axis. The centraliser is pivotable between a horizontal operational position wherein the centraliser is in the firing line, and a non-operational vertical position wherein the firing line is cleared. It is both conceivable that the centraliser extends upwards, or downwards, in the vertical non-operational position.

In embodiments, further equipment is also mounted to the tensioner frame or the pipeline launch tower, such as a line-up tool or accessory handling equipment.

It is preferred to have a crane, preferably an offshore mast crane, provided on deck of the vessel for performing various operations on deck, as well as from and to the vessel. The capacity of such crane may be several hundreds of tons. In preferred embodiments, the crane is used to move large objects to the firing line.

In embodiments, a hoist beam is provided below the tensioner tracks, and possibly below a centraliser. Optionally, the hoist beam is supported by the lowermost tensioner frame, or by the tower. In embodiments, a hoist beam support frame for a hoist beam is provided, supported by the lowermost tensioner frame below the tensioner tracks, and possibly below a centraliser. Optionally, the hoist beam support frame is supported by the tower. Advantageously, the hoist beam is movable along the hoist beam support frame in a horizontal plane, to and from the firing line. Optionally, a sideways movement past the pipeline launch tower is possible.

In embodiments, the hoist beam acts as accessory handling device, and is adapted to position the accessory in an accessory position in the firing line between the hang off device and the A&R sheave arrangement.

Advantageously, but not necessarily, the system of the invention further comprises a hang off device arranged in the lower part of the firing line, adapted to clamp and support the weight of the launched pipeline in the firing line. The weight of the launched pipeline may add up to several hundreds of tonnes when it has been severed from the pipeline section that is held by the tensioners. Advantageously, the hang off device, e.g. a hang off clamp, is provided below said one or more tensioners. These hang-off clamps commonly include multiple mobile clamp parts allowing the clamp to be opened for release and passage of the pipeline and an accessory and closed for support of the pipeline. The hang-off clamp may be supported by the tower. However, preferably, the hang-off clamp is supported on the hull of the vessel, e.g. via a hatch over the moonpool or otherwise.

The marine pipeline system according to the invention is also provided with an abandonment and recovery (A&R) system for abandonment and recovery of a pipeline, which is adapted to raise, lower and support the weight of the launched pipeline in the firing line. The A&R system comprises at least one A&R cable and associated A&R winch, and an A&R sheave arrangement with one or more sheaves provided at an upper position in the firing line. Said one or more sheaves are supported by the pipeline launch tower. The A&R cable is a very strong cable, e.g. designed to carry a load of several hundreds of tonnes, e.g. a 600 mt capacity cable.

With one or more sheaves of the A&R sheave arrangement provided at an upper position of the pipeline launch tower an accessory is positionable below the sheave arrangement and the handling of large objects on deck is possible.

The present invention further relates to a marine reel lay method for laying on the seabed a pipeline including one or more accessories, wherein use is made of a pipeline installation system according to an aspect of the disclosed invention.

The present invention further relates to a method, preferably according to claim 9, comprising the steps of:

- laying the pipeline with the one or more tensioners in the pipelaying mode and the retractable trolley rail part in the retracted and non-operable position;
- operating the one or more tensioners to the retracted mode;
- positioning the accessory in the firing line;
- connecting the accessory to the A&R system and possibly to the pipeline;
- displacing the retractable trolley rail part into the active position;

- engaging the accessory on the auxiliary trolley;
- operating the A&R winch and thereby lowering the accessory and the pipeline by the A&R system, the accessory being engaged on the auxiliary trolley.

In embodiments, in particular for providing an accessory at the trailing end of a pipeline, the method furthermore comprising the steps of:

- laying the pipeline with the one or more tensioners in the pipelaying mode and the retractable trolley rail part in the retracted and non-operable position;
- interrupting pipelaying by engaging the hang off device with the launched pipeline;
- transferring the weight of the launched pipeline to the hang off device;
- severing the pipeline above the hang off device;
- operating the one or more tensioners to the retracted mode;
- positioning the accessory in the firing line;
- connecting the accessory to the end of the launched pipeline supported by the hang off device and to the A&R system;
- displacing the retractable trolley rail part into the active position;
- engaging the accessory on the auxiliary trolley;
- releasing the hang off device from the launched pipeline;
- operating the A&R winch and thereby lowering the accessory and the pipeline by the A&R system, the accessory being engaged on the auxiliary trolley.

In embodiments, in particular for providing an accessory at the trailing end of a pipeline, the method furthermore comprising the steps of:

- laying the pipeline with the one or more tensioners in the pipelaying mode and the retractable trolley rail part in the retracted and non-operable position;
- positioning the end connector in the firing line;
- interrupting pipelaying by engaging the hang off device with the launched pipeline;
- transferring the weight of the launched pipeline to the hang off device;
- operating the one or more tensioners to the retracted mode;
- connecting the end connector to the A&R system;
- displacing the retractable trolley rail part into the active position;
- engaging the accessory on the auxiliary trolley;
- releasing the hang off device from the launched pipeline;
- operating the A&R winch and thereby lowering the end connector and the pipeline by the A&R system, the end connector being engaged on the auxiliary trolley.

In embodiments, the method furthermore comprises the step of connecting the auxiliary trolley to the A&R system, and connecting the accessory to the auxiliary trolley, thereby lowering the accessory and the pipeline by the A&R system, being supported by the auxiliary trolley.

In embodiments, a system is provided wherein at least one tensioner frame comprises a first segment and a second segment, each including at least one of said tracks, wherein the first and second segment are each mounted pivotable about a respective first and second vertical segment pivot axis to the pipeline launch tower, the segments being pivotable between a pipelaying position (wherein the segments are conjoined to form an enclosing pipeline annulus) in which the tracks are positioned to engage the pipeline; and an open retracted position, wherein the first and second segments are disconnected and separated, thereby creating a clear envelope about the firing line for passage of an accessory, wherein the trolley rail extends between the first and second vertical segment pivot axes. The first and second segment are each mounted pivotable to a carrier which is displaceable along a tensioner rail which is mounted to the pipeline launch tower, extending parallel to the firing line, allowing the one or more tensioners to be translatable in the firing line, along the pipeline launch tower, and wherein a tensioner displacement drive is provided to support and translate the one or more tensioners along the pipeline launch tower, wherein preferably the trolley rail further comprises a carrier trolley rail part mounted on the carrier. When use is made of such a system, the present invention also relates to a method comprising the steps of:

- providing the retractable trolley rail part in the retracted and non-operable position;
- providing the one or more tensioners in the pipelaying mode and in an upper pipelaying position wherein the one or more tensioners at least partially overlap an end connector entry position;
- laying the pipeline;
- operating the one or more tensioners to the retracted mode;
- translating the one or more tensioners to a lower parking position wherein the one or more tensioners have moved below the end connector entry position;
- displacing the retractable trolley rail part to the active position, wherein the auxiliary trolley is positioned to engage on the end connector in the firing line;
- lowering the end connector.

Figure 1B:
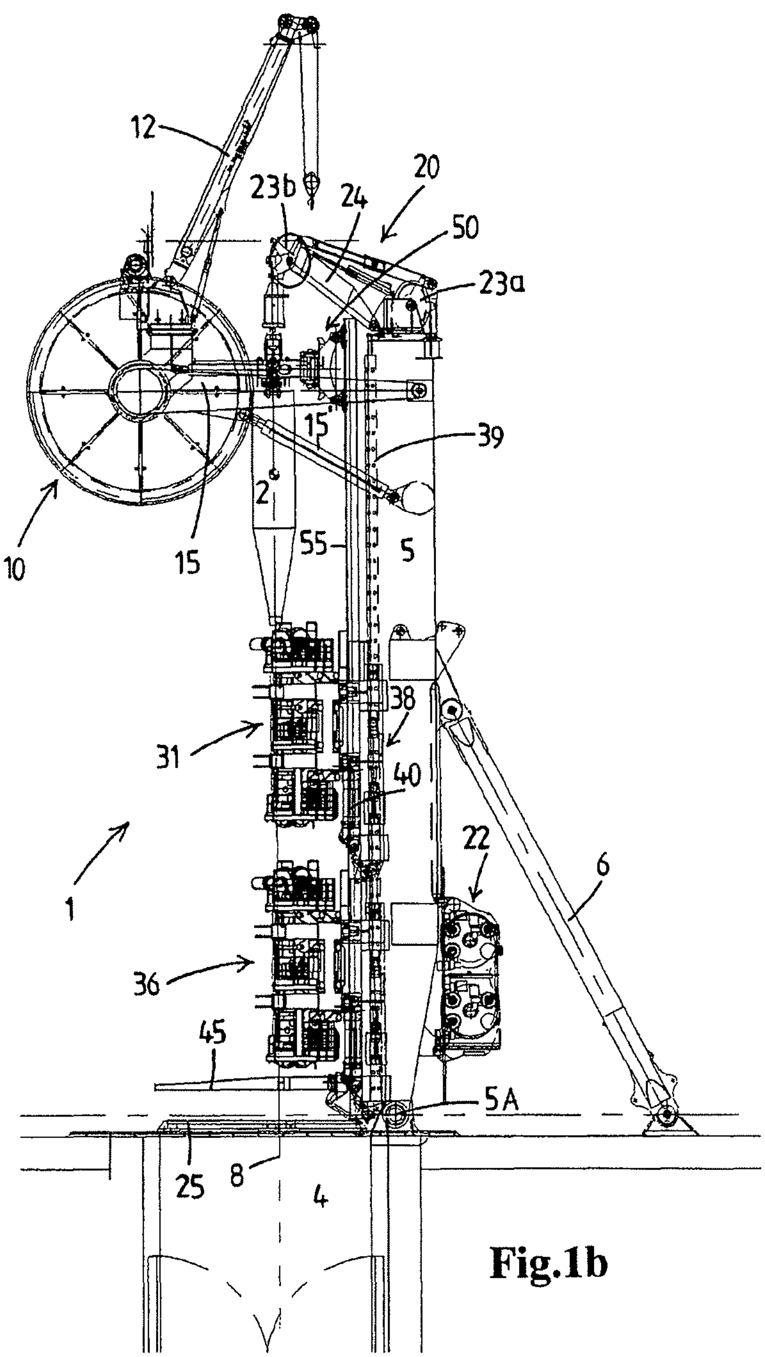
Figure 2A:
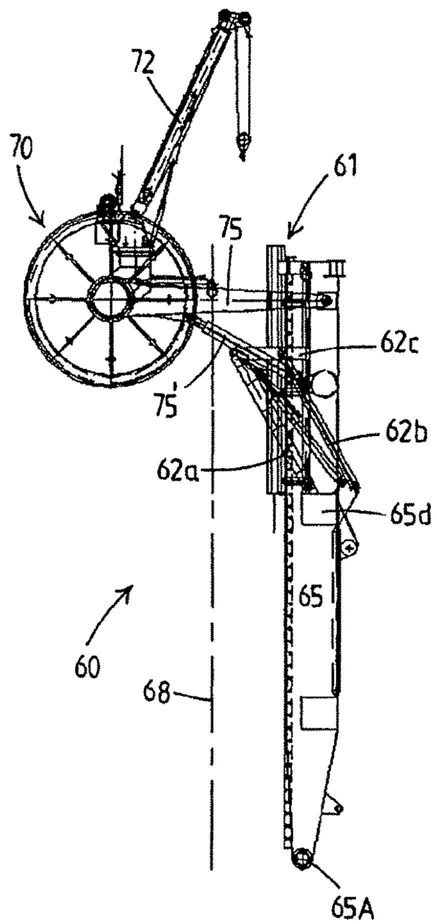
Figure 2B:
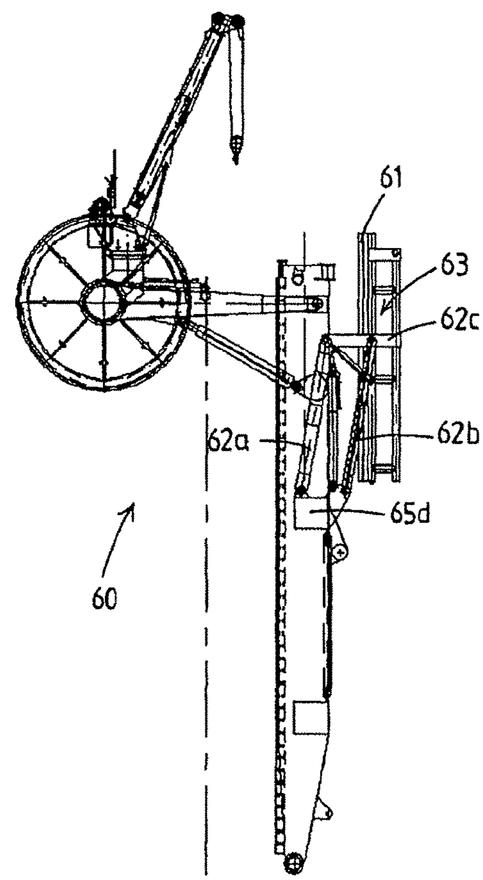
Figure 2C:
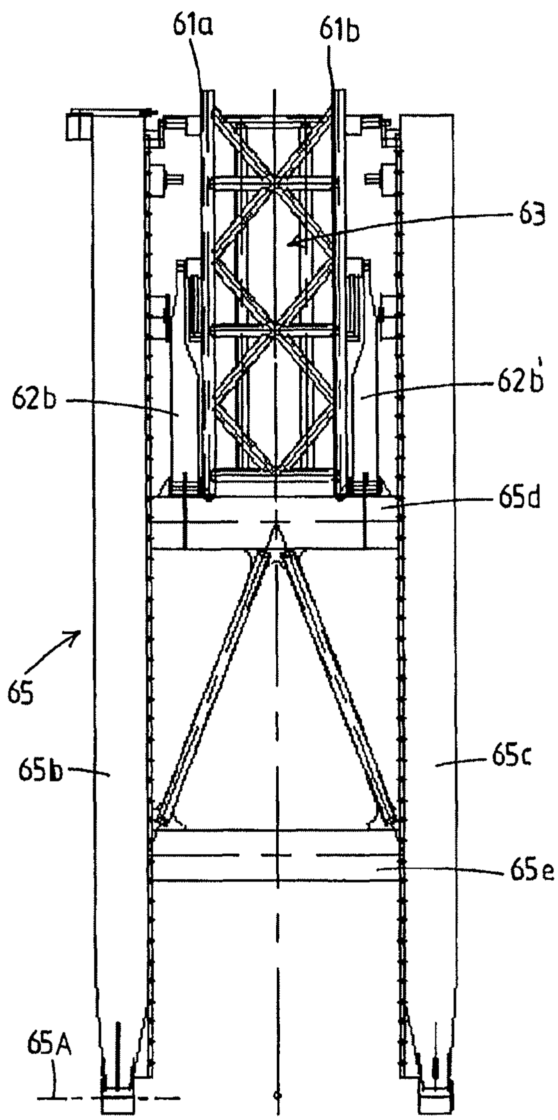

The invention can be further explained in relation to the drawings, in which:

FIG. 1*a* is a side view of a marine reel lay method pipeline installation system according to the invention with the retractable trolley rail part in the retracted and non-operable position;

FIG. 1*b* is a similar side view as shown in FIG. 1*a*, with the retractable trolley rail part in the active position;

FIG. 2*a* is a side view of part of a marine reel lay method pipeline installation system according to the invention with the retractable trolley rail part in the active position;

FIG. 2*b* is a similar side view as shown in FIG. 2*a*, with the retractable trolley rail part in the retracted and non-operable position;

FIG. 2*c* is a rear view on the part of the marine reel lay method pipeline installation system of FIGS. 2*a* and 2*b;*

Figure 3A:
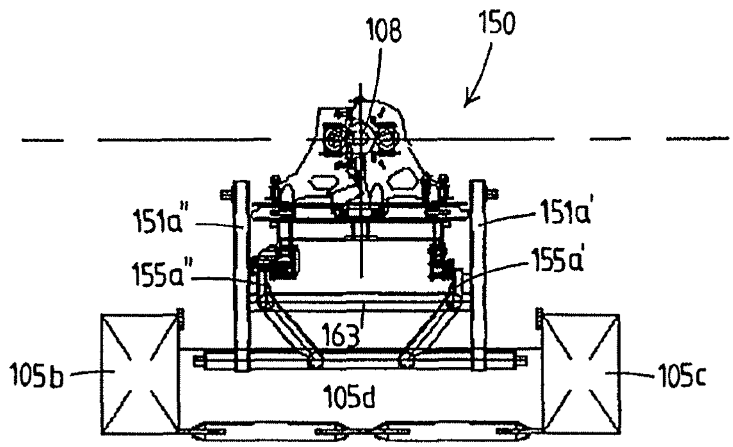
Figure 3B:
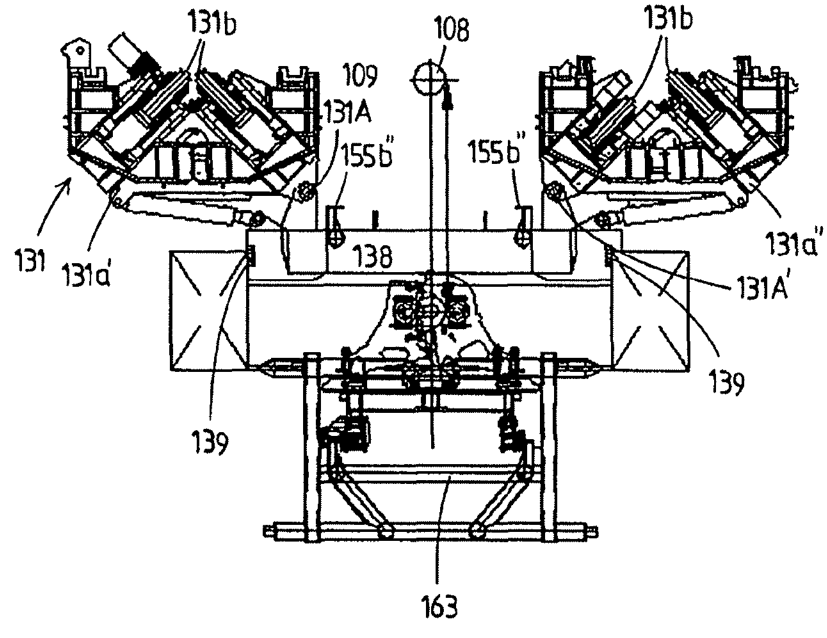
Figure 3C:
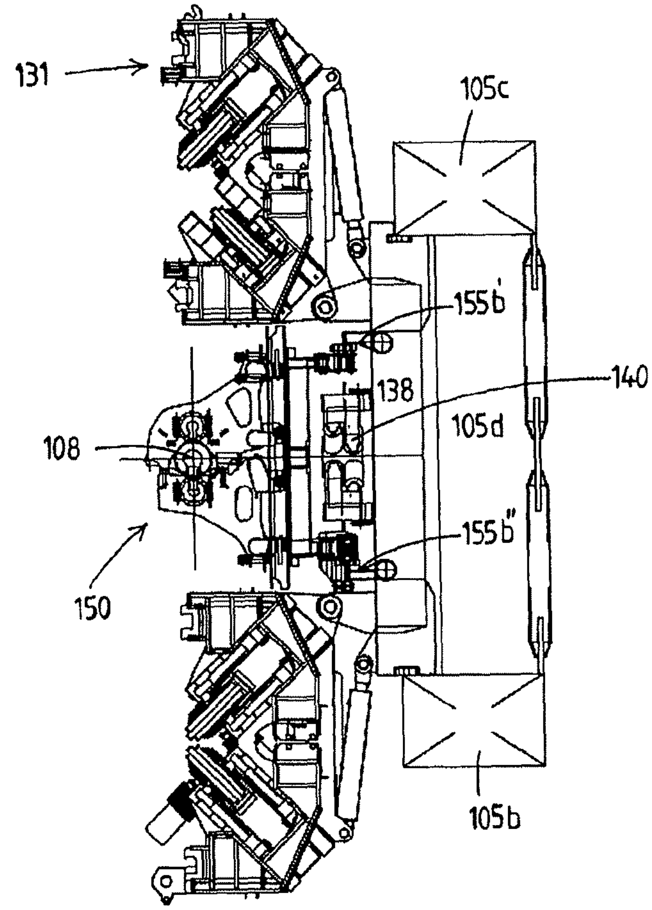
Figure 4A:
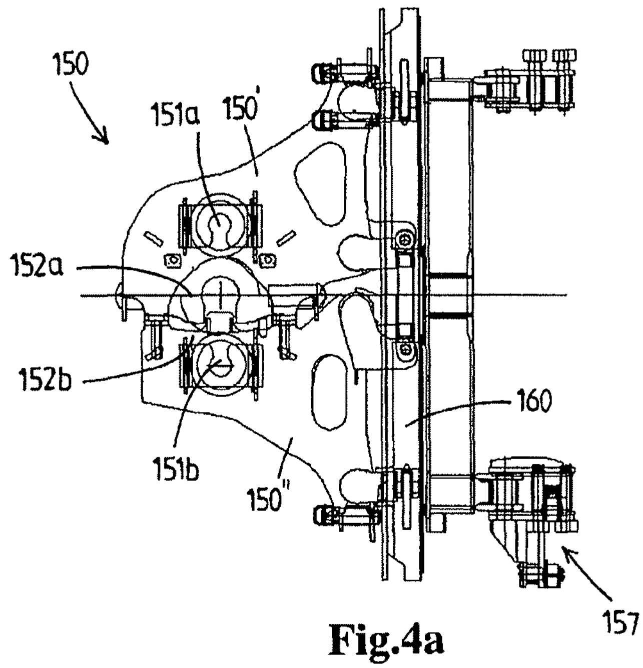
Figure 4B:
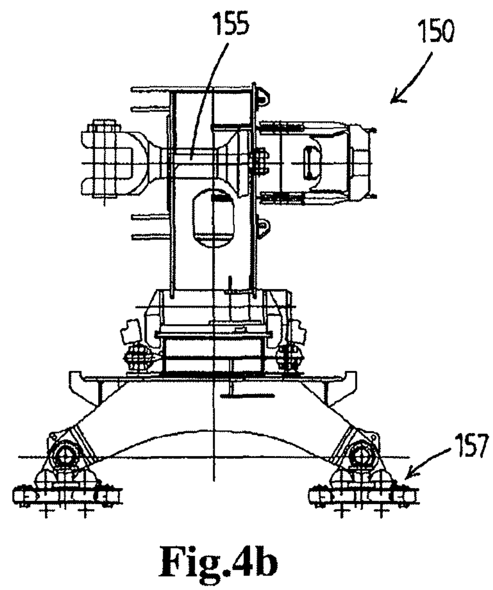

FIG. 3*a* is a cross-sectional top view through a marine reel lay method pipeline installation system with the retractable trolley rail part in the active position;

FIG. 3*b* is a similar cross-sectional view as shown in FIG. 3*a*, with the retractable trolley rail part in the retracted and non-operable position and with the tensioner frame in a retracted mode;

FIG. 3*c* is a similar cross-sectional view as shown in FIGS. 3*a* and 3*b*, with the retractable trolley rail part in the active position and with the tensioner frame in a retracted mode;

FIG. 4*a* is a cross-sectional top view of an embodiment of an auxiliary trolley;

FIG. 4*b* is a cross-sectional side view of the auxiliary trolley of FIG. 4*a;*

Figure 5:
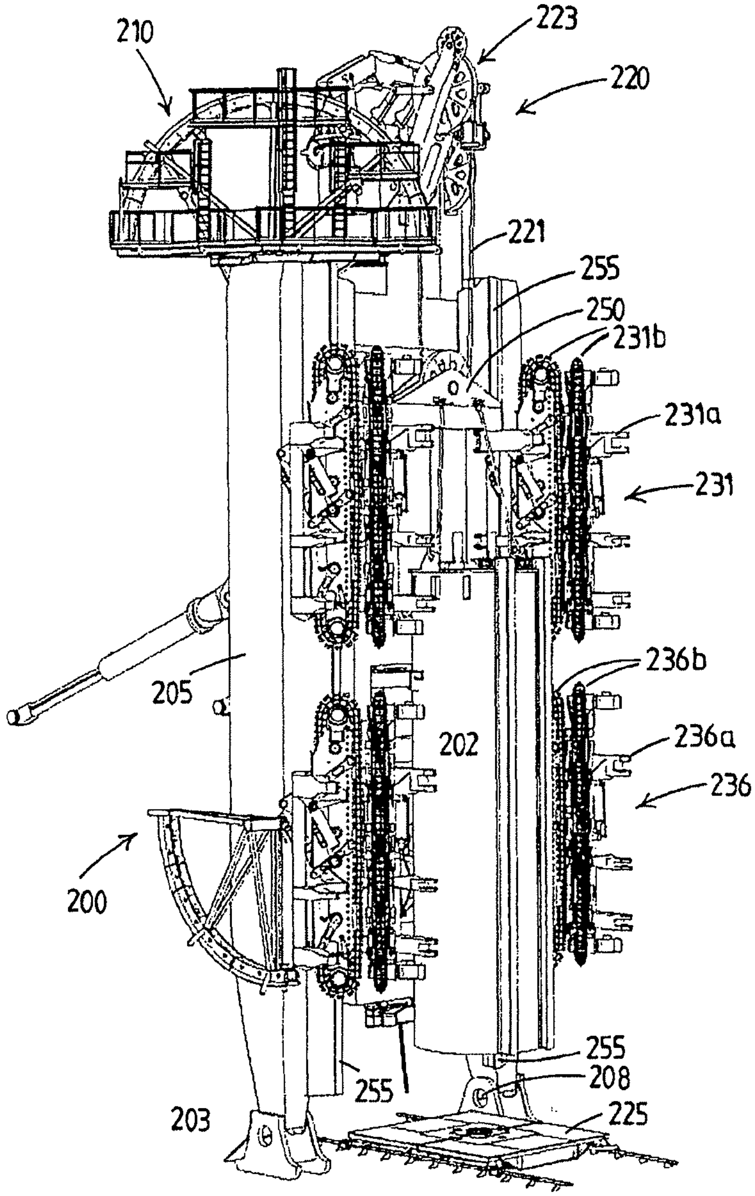
Figure 6A:
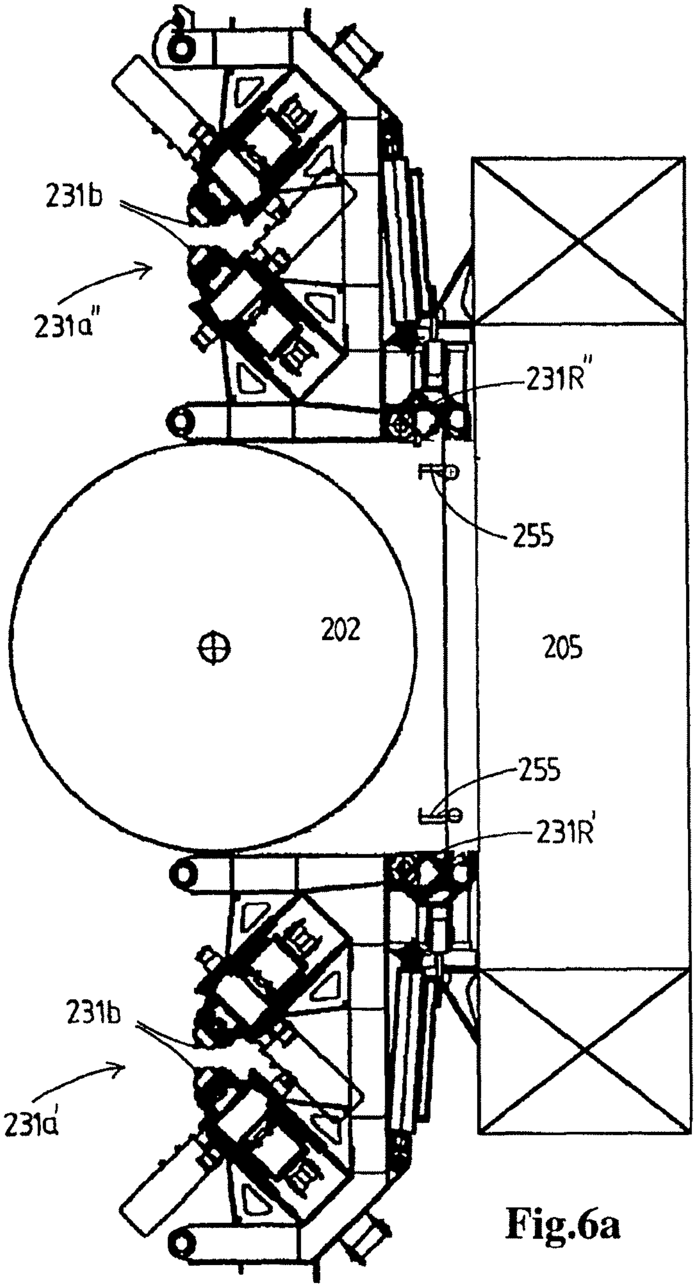
Figure 6B:
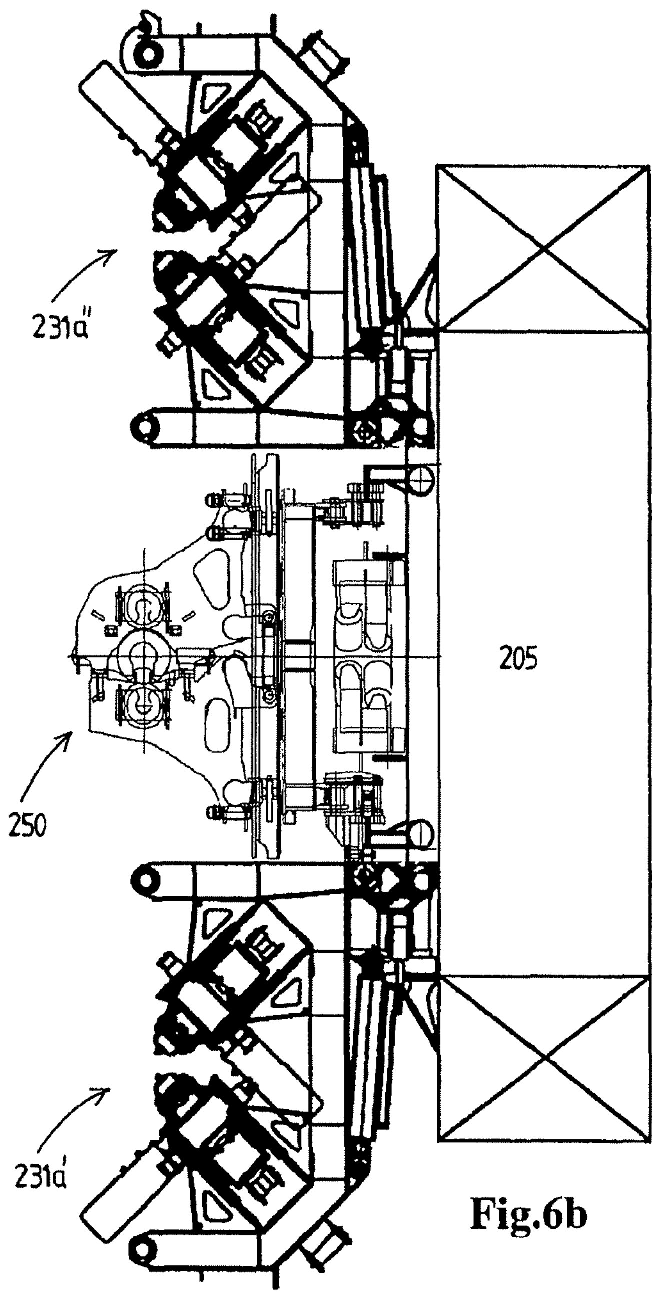
Figure 7:
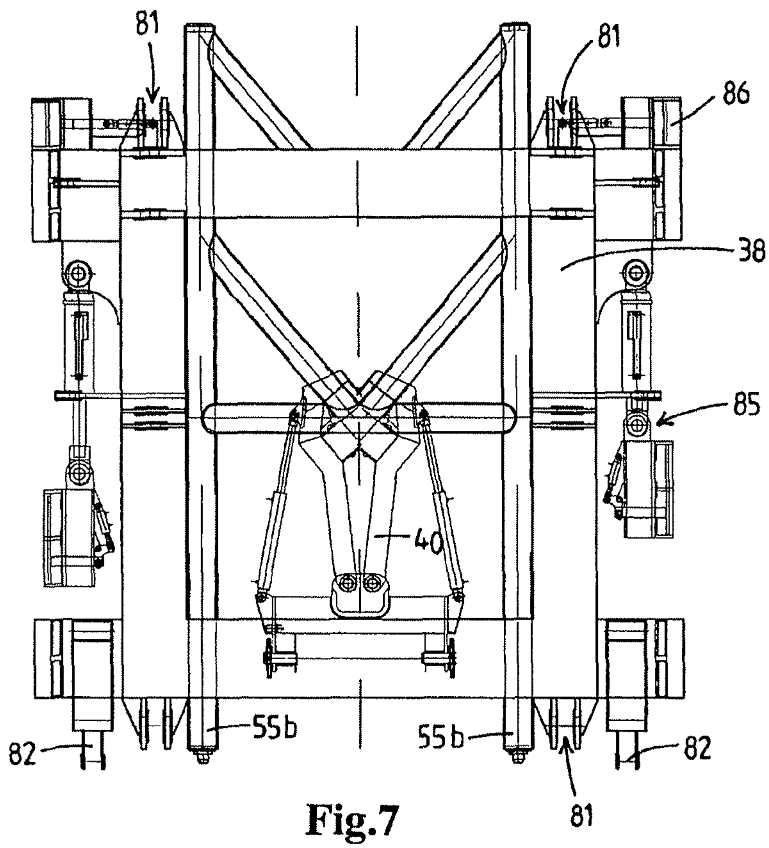
Figure 8A:
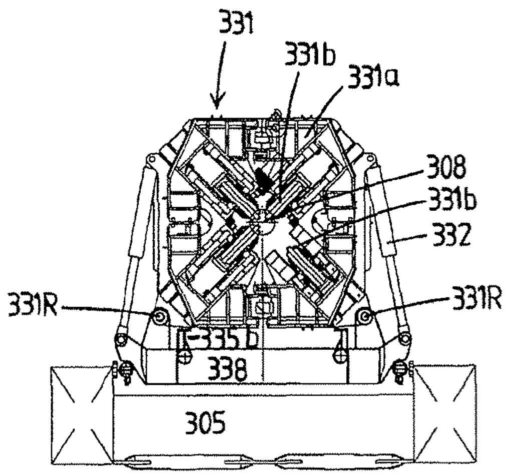
Figure 8B:
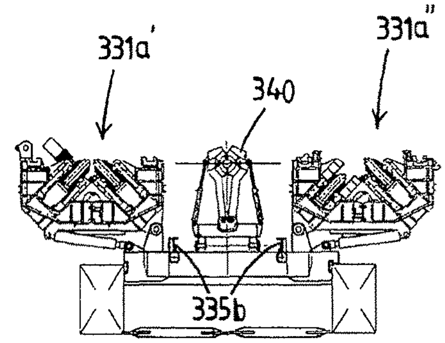
Figure 8C:
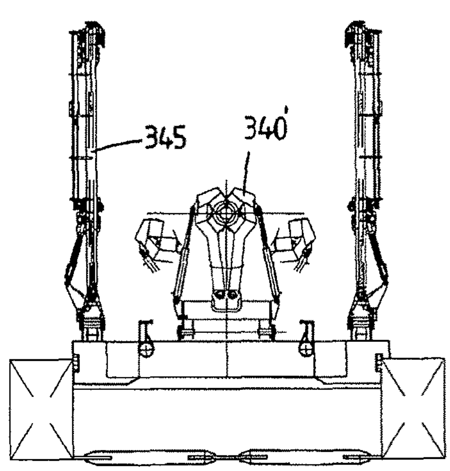
Figure 8D:
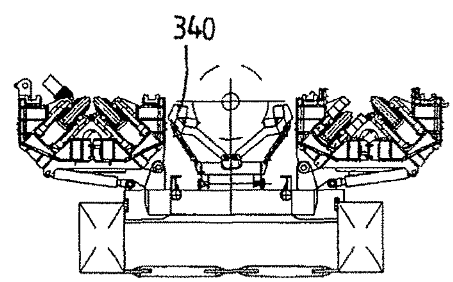

FIG. 5 is a perspective view of a marine reel lay method pipeline installation system according to the invention wherein the vertical trolley rail is supported by the pipeline launch tower and with the tensioner comprising a first and second segment in the retracted mode;

FIG. 6*a* is a cross-sectional top view of a marine reel lay method pipeline installation system with the tensioner comprising a first and second segment in the retracted mode, and with an accessory therebetween;

FIG. 6*b* is a similar cross-sectional top view of FIG. 6*a*, with an auxiliary trolley between a first and second segment of the tensioner in the retracted mode;

FIG. 7 is a rear view onto a tensioner carrier;

FIG. 8*a* is a cross-sectional top view through a tensioner in the active pipelaying mode of a marine reel lay method pipeline installation system;

FIG. 8*b* is a similar view of that of FIG. 8*a* through a tensioner in the retracted mode and a centralizer in an active position;

FIG. 8*c* is a similar view of that of FIGS. 8*a* and 8*b* through a centralizer and a hoist beam;

FIG. 8*d* is a similar view of that of FIGS. 8*a* and 8*b* through a tensioner in the retracted mode and a centralizer in an open position.

In FIGS. 1*a* and 1*b* side views of a marine reel lay method pipeline installation system 1 according to the invention are shown, for laying on the seabed a pipeline and/or installing a subsea riser (not shown), including one or more accessories such as the end fitting 2 visible in FIG. 1*b*. The system is here embodied as a vessel with a deck 3 in which a moonpool 4 is provided. Not shown are one or more pipeline storage reels for storage of pipeline to be laid.

Adjacent the moonpool a pipeline launch tower 5 is provided, which is adapted to launch the pipeline in a firing line 8 along said tower, into the moonpool 4. The tower of the shown embodiment is pivotable about pivot axis 5A. Via adjuster 6 the inclination of the tower 5 is adjustable.

A pipeline guide 10, here embodied as a guide wheel, is provided at an elevated position, which pipeline guide is adapted to guide the pipeline from a storage reel over the pipeline guide into the firing line. In the shown embodiment, the not shown storage reel is provided at the left-hand side of the drawing, and the pipeline guide 10 guides the pipeline over a curved path from the left-hand side to the right-hand side into the firing line 8. Pipeline guide 10 is supported by the tower 5 via a guide frame 15. Via piston 15' the position of the pipeline guide 10 can be altered. In particular, the pipeline guide 10 can be displaced from a pipelaying position as visible in FIG. 1*a*, wherein the pipeline guide 10 is adjacent the firing line, and a retracted position as visible in FIG. 1*b*, wherein the pipeline guide 10 has moved away from the firing line 8, allowing the passage of an accessory, here end fitting 2, in the firing line 8.

The guide frame 15 further supports a crane 12, which, as is visible in FIG. 1*b*, may be used to assist in positioning an accessory such as end fitting 2 into the firing line.

The marine pipeline system 1 is furthermore provided with an abandonment and recovery (A&R) system 20 comprising at least one A&R cable 21 and associated A&R winch 22, and an A&R sheave arrangement with one or more sheaves provided at an upper position in the firing line, said one or more sheaves being supported by the pipeline launch tower 5, adapted to raise, lower and support the weight of the launched pipeline in the firing line 8. In the shown embodiment, an A&R sheave 23*a* is directly supported by the tower 5, and A&R sheave 23*b* is supported via a pivotable boom 24. The position of A&R sheave 23*b* is adjustable via the boom 24, e.g. to a position remote from the firing line as visible in FIG. 1*a* and a position adjacent the firing line 8 as visible in FIG. 1*b*.

A hang off device 25 is arranged in the lower part of the firing line 8, here at the level of deck 3, which is adapted to clamp and support the weight of the launched pipeline in the firing line. The hang-off device 25 can be opened to allow the passage of an accessory, here through the moonpool 4.

The shown marine pipeline installation system 1 comprises two tensioners 31, 36, each tensioner comprising a tensioner frame 31*a*, 36*a* and four tracks 31*b*, 36*b*, supported by said tensioner frame. Tensioners 31, 36 are operable between an active pipelaying mode as visible in FIG. 1*a* and a retracted mode as is visible in FIG. 1*b*, here via cylinders 32. In the active pipelaying mode the firing line extends through the tensioner frame and between the tracks, so that the tracks are positioned to engage the pipeline and to support the pipeline in the firing line 8. In the retracted mode a clear envelope is created about the firing line 8. Such a tensioner is further explained in relation to FIGS. 3*a*-3*c*.

The tensioners 31, 36 are mounted to a carrier 38 which is displaceable along a tensioner rail 39 which is mounted to the pipeline launch tower 5, extending parallel to the firing line, allowing the tensioners to be translatable in the firing line 8, along the pipeline launch tower. Not visible is a tensioner displacement drive which is provided to support and translate the one or more tensioners along the pipeline launch tower. On the tensioner rail 39 a number of holes 39*a* is visible, used to fix the carrier 38 to the tensioner rail 39 in a position. The carrier 38 is shown in further detail in FIG. 7

In the shown embodiment, the tensioners are displaceable to an upper accessory handling position wherein the one or more tensioners have moved above a lower accessory position. This position is not shown, but the tensioner rail 39 at the upper part of the tower is visible, where the tensioners are in the upper accessory handling position when a large accessory, e.g. a PLET, is provided at the lower part of the firing line between the hang off clamp 25 and the lowest tensioner 36.

In FIG. 1*a*, the tensioners are shown in a pipelaying position, wherein the tensioners at least partially overlap the above-defined accessory position. In FIG. 1*b*, the tensioners are positioned in a lower parking position wherein the one or more tensioners have moved below an end connector entry position, where end connector 2 is in FIG. 1*b*. In the pipelaying position of FIG. 1*a* the tensioners partially overlap this end connector entry position.

Below the upper tensioner 31, a centraliser 40 is provided to centralise the pipeline in the firing line. Centraliser 40 is mounted to the carrier 38 and thus translatable together with the tensioners 31, 36. The centralizer 40 is mounted movable between a horizontal operational position as visible in FIG. 1*a*, wherein the centralizer is in the firing line, and a non-operational vertical position as visible in FIG. 1*b*, wherein the firing line is cleared. Such a centralizer will further be elucidated in relation of FIGS. 8*a*-8*d*.

Below the lower tensioner 36, in the shown embodiment a hoist beam 45 is provided, which is supported by the carrier 38 and thus translatable together with the tensioners 31, 36. This hoist beam may assist in positioning an accessory, such as a PLET, in a position below the lowermost tensioner 36.

According to the present invention, an auxiliary trolley 50 is provided which is movable along a vertical trolley rail 55 and which is adapted to engage on an accessory 2 in the firing line 8 in the retracted mode of the one or more tensioners, as is visible in FIG. 1*b*. From this FIG. 1*b*, it is visible that the vertical trolley rail 55 extends to a position adjacent the A&R sheave arrangement, to the upper end of the tower 5. Also, it is visible that the trolley 50 has such dimensions that it is adjacent the retracted position of the pipeline guide 10. Hence, the auxiliary trolley 50 in the position of FIG. 1*b* overlaps the pipelaying position of the pipeline guide 10 of FIG. 1*a*. Details of the auxiliary trolley are explained in relation to FIGS. 4*a* and 4*b*.

According to the invention, as shown in FIG. 1*a*, the trolley rail 55 comprises a retractable trolley rail part 55*a* supported by the tower 5 via an associated mobile rail support assembly, here comprising parallel bars 51*a*, 51*b*, part of a parallel bar linkage mechanism. The mobile rail support assembly is adapted to allow for displacement of the retractable trolley rail part 55*a* together with the auxiliary trolley 50 when arranged on said retractable trolley rail part 55*a* with respect to the tower 5 between an active position, wherein the auxiliary trolley is positioned to engage on an accessory in the firing line, as visible in FIG. 1*b*, and a retracted and non-operable position wherein a clear envelope about the firing line is created, as visible in FIG. 1*a*. A fixation device 52 is provided to fixate the auxiliary trolley 50 to the retractable trolley rail part 55*a*, in the retracted position thereof.

In FIGS. 2*a* and 2*b* part of a marine reel lay method pipeline installation system 60 according to the invention is shown. A pipeline launch tower 65 is visible, pivotable about pivot axis 65A. In FIG. 2*c* it is visible that the tower comprises two parallel vertical stands 65*b*, 65*c*, interconnected by horizontal cross beams 65*d*, 65*e*.

Onto the tower 65 a pipeline guide 70 is mounted via a guide frame 75. The position of the pipeline guide 70 can be changed via cylinder 75'. A crane 72 is mounted to the pipeline guide 70.

A retractable trolley rail part 61 is shown, here without an auxiliary trolley arranged on said retractable trolley rail part. The retractable trolley rail part 61 is supported by the tower 65 via an associated mobile rail support assembly, here comprising a frame 63 supporting the rails 61*a*, 61*b* (visible in FIG. 2*c*) and a parallel bar linkage. The parallel bar linkage is formed by parallel bars 62*a*, 62*b*, and 62*a*' (not visible) and 62*b*', a connection bar 62*c* and the horizontal cross beam 65*d*.

In the position of FIG. 2*a*, the retractable trolley rail part 61 is in an active position, wherein the auxiliary trolley (not shown) is in a position to engage on an accessory in a firing line 68. In the position of FIG. 2*b*, the retractable trolley rail part 61 is in a retracted and non-operable position wherein a clear envelope about the firing line is created.

In FIGS. 3*a*-3*c* a tensioner 131, similar to tensioner 31 of FIGS. 1*a* and 1*b*, and auxiliary trolley 150, similar to auxiliary trolley 50 of FIGS. 1*a* and 1*b*, are shown in more detail.

Part of a pipeline launch tower is shown in cross section, comprising parallel upright beams 105*b*, 105*c*, between which horizontal cross beams are provided. Cross beam 105*d* is visible.

In FIG. 3*a*, auxiliary trolley 150 is visible which is movable along a vertical trolley rail and which is adapted to engage on an accessory in the firing line 108. The tensioner is not visible. The auxiliary trolley 150 is in FIG. 3*a* arranged on a retractable trolley rail part comprising parallel rails 155*a*' and 155*a*". The retractable trolley rail part is supported by the tower, in particular cross beam 105*d*, via a frame 163 and a mobile rail support assembly, here a parallel bar linkage of which parallel bars 151*a*' and 151*a*" are visible. The retractable trolley rail part arranged on said retractable trolley rail part is in FIG. 3*a* in an active position, wherein the auxiliary trolley 150 is positioned to engage on an accessory in the firing line 108.

In FIG. 3*b*, the retractable trolley rail part with rails 155*a*' and 155*a*" is in a retracted and non-operable position, wherein a clear envelope 109 about the firing line 108 is created. Tensioner 131 comprises a tensioner frame 131*a* and four tracks 131*b* supported by said tensioner frame 131*a*. The tensioner 131 is operable between an active pipelaying mode, not shown, wherein the firing line extends through the tensioner frame and between the tracks, so that the tracks are positioned to engage the pipeline and to support the pipeline in the firing line 108. In FIGS. 3*b* and 3*c*, the tensioner is shown in a retracted mode wherein a clear envelope 109 is created about the firing line 108.

The tensioner frame 131*a* comprises a first segment 131*a*' and a second segment 131*a*", here each including two of the four tracks 131*b*. The first and second segment are each mounted pivotable about a respective first vertical segment pivot axis 131A and second vertical segment pivot axis 131A' via a carrier 138 to the pipeline launch tower. The segments are pivotable between a pipelaying position, not shown, in which the tracks are positioned to engage the pipeline; and an open retracted position, visible in FIGS. 3*b* and 3*c*, wherein the first and second segments are disconnected and separated, thereby creating a clear envelope about the firing line for passage of an accessory. The carrier 138 is displaceable along a tensioner rail 139 which is mounted to the pipeline launch tower.

The trolley rail comprises a carrier trolley rail part with rails 155*b*', 155*b*" which are mounted on the carrier, between the first and second vertical segment pivot axes 131A and 131A'. In FIG. 3*b*, these carrier trolley rail parts are clearly visible. The carrier trolley rail part with rails 155*b*', 155*b*" of FIG. 3*b* is in line with the retractable trolley rail part with rails 155*a*' and 155*a*" in the active position of FIG. 1*a*, allowing the auxiliary trolley 150 to move from the retractable trolley rail part onto the carrier trolley rail part, as is visible in FIG. 3*c*, between the segments of the tensioner frame 131.

In FIG. 3*c*, a centralizer 140 is visible between the carrier trolley rail part with rails 155*b*', 155*b*", similar to centralizer 40 shown in FIGS. 1*a* and 1*b*. Similar to the situation in FIG. 1*b*, the centralizer is mounted movable between a horizontal operational position wherein the centralizer is in the firing line, and a non-operational vertical position as visible in FIG. 3*c* (and FIG. 1*b*), wherein the firing line is cleared.

In FIGS. 4*a* and 4*b* the auxiliary trolley 150 of FIGS. 3*a*-3*c* is shown in further detail. The auxiliary trolley 150 comprise two trolley parts 150' and 150", each part comprising an A&R cable guide 151*a*, 151*b* and a clamp part 152*a*, 152*b*. The trolley parts 150', 150" are movable along a horizontal guide 160, e.g. via shift cylinders. The auxiliary trolley 150 is movable along a vertical trolley rail via bogies 157. Alternatively, guide wheels may be provided. In FIG. 4*b* a pipe fitting piece 155 is clamped by clamp parts 152*a*, 152*b*, used to connect a pipe end to the auxiliary trolley 150. It is noted that a similar auxiliary trolley has been disclosed in WO2014/120004 of the same applicant.

In FIGS. 5, 6*a* and 6*b* a marine reel lay method pipeline installation system 200 according to an aspect of the invention is shown, for laying on the seabed a pipeline and/or installing a subsea riser including one or more accessories. Here a large accessory 202 is visible. The system 200 is provided on a deck 203, e.g. of a vessel, furthermore comprising one or more pipeline storage reels for storage of pipeline to be laid (not visible). The system comprises a pipeline launch tower 205, which is adapted to launch the pipeline in a firing line 208 along said tower. A pipeline guide 210, here embodied as a semi-circular chute, is provided at an elevated position, here supported by an upper part of the tower 205, which pipeline guide is adapted to guide the pipeline from a storage reel over the pipeline guide into the firing line.

Two tensioners 231, 236 are provided, each tensioner comprising a tensioner frame 231*a*, 236*a* and multiple tracks 231*b*, 236*b* supported by said tensioner frame. The tensioners are operable between an active pipelaying mode, not shown, wherein the firing line extends through the tensioner frame and between the tracks, so that the tracks are positioned to engage the pipeline and to support the pipeline in the firing line 208, and a retracted mode wherein a clear envelope is created about the firing line. In FIG. 5 the clear envelope is not visible as the accessory 202 is provided in the firing line.

The marine reel lay method pipeline installation system 200 further comprises a hang off device 225 arranged in the lower part of the firing line, adapted to clamp and support the weight of the launched pipeline in the firing line. In addition, an abandonment and recovery (A&R) system 220 is provided comprising at least one A&R cable 221 and associated A&R winch (not visible), and an A&R sheave arrangement 223 with one or more sheaves provided at an upper position in the firing line, said one or more sheaves being supported by the pipeline launch tower, adapted to raise, lower and support the weight of the launched pipeline in the firing line.

An auxiliary trolley 250 is provided which is movable along a vertical trolley rail 255 and which is adapted to engage on an accessory 202 in the firing line 208 in the retracted mode of the one or more tensioners, as visible in FIG. 5.

Each of the tensioner frames 231*a*, 231*b* comprises a first segment and a second segment each including two of said tracks. In FIG. 6*a*, a first segment 231*a*' and a second segment 231*a*" are visible, each including two tracks 231*b*. The first and second segment 231*a*' and 231*a*" are each mounted pivotable about a respective first and second vertical segment pivot axes 231R' and 231R" to the pipeline launch tower 205. The segments are pivotable between a pipelaying position in which the tracks are positioned to engage the pipeline, not shown, and an open retracted position, wherein the first and second segments are disconnected and separated, thereby creating a clear envelope about the firing line for passage of an accessory, as visible in FIGS. 5, 6*a* and 6*b*. The trolley rail 255 extends between the first and second vertical segment pivot axes 231R' and 231R". In FIGS. 5, 6*a* and 6*b* the vertical trolley rail 255 is supported by the pipeline launch tower 205. It is conceivable that also a retractable trolley rail part is provided. The auxiliary trolley is movable along the vertical trolley rail when the first and second segments of the tensioner frame are in the open retracted position.

FIG. 7 is a rear view onto a tensioner carrier 38. The tensioner itself is not visible. The tensioner carrier 38 comprises pivot connections 81 allowing the segments of the tensioner frame to be pivotably connected to. As visible e.g. in FIG. 8*a*, the segments are pivotable via hydraulic cylinders, which are connected to the tensioner carrier via connections 82. The trolley rail, in particular carrier trolley rail part 55*b*, extending between the first and second vertical segment pivot axes at connection points 81 is also visible. Also a tensioner displacement drive 85, embodied similar to a jackup leg system, is visible. The carrier 38 is provided with a connection device 86 to fix the carrier 38 to one of the holes 39*a* on the tower to fix the tensioners in a certain position. A centralizer 40 is shown in the vertical position, pivoted away from the firing line, similar to the situation shown in FIG. 1*b*.

In FIG. 8*a* is a cross-sectional top view through a tensioner 331 in the active pipelaying mode of a marine reel lay method pipeline installation system is shown. The tensioner 331 comprises a frame 331*a* and four tracks 331*b*, one of which in the shown situation does not engage a pipeline in the firing line 308. The tensioner frame 331*a*, according to an aspect of the invention, comprises two segments 331*a*' and 331*a*" as visible in FIG. 8*b*. The segments are mounted pivotable about a pivot axis 331R to a carrier 338, which is translatable along the tower 305. A carrier trolley rail part 355*b* extends between the first and second vertical segment pivot axes 331R.

In FIGS. 8*b* and 8*d*, it is shown that further a centralizer 340 may be provided between the first and second vertical segment pivot axes 331R, and between the rails of the carrier trolley rail part 335*b*. In the clear area around the firing line 308 created by the opening of the segments of the tensioner, the centralizer 340 can be opened to the extent shown in FIG. 8*d*, allowing large pipelines and/or pipe sections and/or accessories such as end fittings to be centralized. Alternatively, it is possible to remove the centralizer from the firing line by pivoting it to a vertical position.

In FIG. 8*c*, a cross section through a bottom part of the tower 305 is visible, where hoist beams 345 are provided, similar to hoist beams 45 in FIGS. 1*a* and 1*b*. In the shown embodiment, a further centralizer 340' is provided between the hoist beams.

The invention claimed is:

1. A marine reel lay pipeline installation system for laying on the seabed a pipeline and/or installing a subsea riser including one or more accessories, wherein the system comprises:

one or more pipeline storage reels for storage of pipeline to be laid;

a pipeline launch tower, which is adapted to launch the pipeline in a firing line along said tower;

a pipeline guide which is provided at an elevated position, the pipeline guide is adapted to guide the pipeline from a storage reel over the pipeline guide into the firing line, one or more tensioners, each tensioner comprising a tensioner frame and multiple tracks supported by said tensioner frame, the one or more tensioners being operable between an active pipelaying mode, wherein the firing line extends through the tensioner frame and between the tracks, so that the tracks are positioned to engage the pipeline and to support the pipeline in the firing line, and a retracted mode wherein a clear envelope is created about the firing line;

a hang off device arranged in the lower part of the firing line, adapted to clamp and support the weight of the launched pipeline in the firing line;

an abandonment and recovery (A&R) system comprising at least one A&R cable and associated A&R winch, and an A&R sheave arrangement with one or more sheaves provided at an upper position in the firing line, said one or more sheaves being supported by the pipeline launch tower, adapted to raise, lower and support the weight of the launched pipeline in the firing line;

an auxiliary trolley which is movable along a vertical trolley rail and which is adapted to engage on an accessory in the firing line in the retracted mode of the one or more tensioners;

wherein at least one tensioner frame comprises a first segment and a second segment, each including at least one of said tracks, wherein the first and second segment are each mounted pivotable about a respective first and second vertical segment pivot axis to the pipeline launch tower, the first and second segments being pivotable between a pipelaying position in which the tracks are positioned to engage the pipeline, and an open retracted position, wherein the first and second segments are disconnected and separated, thereby creating a clear envelope about the firing line for passage of an accessory, wherein the trolley rail extends between the first and second vertical segment pivot axes.

2. The marine reel lay pipeline installation system according to claim 1, wherein at least a part of the vertical trolley rail is supported by the pipeline launch tower.

3. The marine reel lay pipeline installation system according to claim 1, wherein in the pipelaying position, the first and second segments are conjoined to form an enclosing pipeline annulus.

4. The marine reel lay pipeline installation system according to claim 1, wherein the tensioner comprises four tracks and both the first and second segment each include two tracks.

5. The marine reel lay pipeline installation system according to claim 1, wherein in the open retracted position of the first and second segments, a lateral opening is created in the tensioner over the entire height thereof, allowing for the lateral introduction and/or removal of a pipeline or other item into the firing line.

6. The marine reel lay pipeline installation system according to claim 1, wherein the trolley rail extends between the first and second vertical segment pivot axes and at least over the entire length of the one or more tensioners.

7. The marine reel lay pipeline installation system according to claim 6, wherein the trolley rail also extends above and/or below the one or more tensioners.

8. The marine reel lay pipeline installation system according to claim 1, wherein the first and second segments are each mounted pivotable to a carrier which is displaceable along a tensioner rail which is mounted to the pipeline launch tower, extending parallel to the firing line, allowing the one or more tensioners to be translatable in the firing line, along the pipeline launch tower, wherein a tensioner displacement drive is provided to support and translate the one or more tensioners along the pipeline launch tower, and wherein the trolley rail further comprises a carrier trolley rail part mounted on the carrier.

9. The marine reel lay pipeline installation system according to claim 8, wherein the first and second segments are mounted to distinct carriers.

10. The marine reel lay pipeline installation system according to claim 9, wherein the distinct carriers can be driven separately, allowing the first and second segments to be at different heights.

11. The marine reel lay pipeline installation system according to claim 8, wherein the one or more tensioners are displaceable at least between an upper accessory handling position, where the one or more tensioners have moved above a lower accessory position, and a lower pipelaying position, where the one or more tensioners at least partially overlap the accessory position.

12. The marine reel lay pipeline installation system according to claim 8, wherein the one or more tensioners are displaceable at least between a lower parking position where the one or more tensioners have moved below an end connector entry position, and an upper pipelaying position where the one or more tensioners at least partially overlap the end connector entry position.

13. The marine reel lay pipeline installation system according to claim 12, wherein the upper pipelaying position and/or the upper accessory handling position overlap the active position of a retractable trolley rail part.

14. The marine reel lay pipeline installation system according to claim 1, wherein the trolley rail comprises a tower trolley rail part supported by the tower below the one or more tensioners, in the vicinity of and at a position below the hang off device, and the auxiliary trolley is movable to a position below the lowermost tensioner.

15. The marine reel lay pipeline installation system according to claim 1, wherein the trolley rail comprises a retractable trolley rail part supported by the tower via an associated mobile rail support assembly, which is adapted to allow for displacement of the retractable trolley rail part together with the auxiliary trolley when arranged on said retractable trolley rail part with respect to the tower between an active position, where the auxiliary trolley is positioned to engage on an accessory in the firing line, and a retracted and non-operable position, where a clear envelope about the firing line is created.

16. A marine reel lay method for laying on the seabed a pipeline including one or more accessories, comprising the pipeline installation system according to claim 1, the method comprising the steps of:

laying the pipeline with the one or more tensioners in the pipelaying mode;

operating the one or more tensioners to the retracted mode;

positioning the accessory in the firing line;

connecting the accessory to the A&R system and possibly to the pipeline;

engaging the accessory on the auxiliary trolley; and operating the A&R winch to lower the accessory and the pipeline by the A&R system, the accessory being engaged on the auxiliary trolley.

17. The marine reel lay method according to claim 16, further comprising the steps of:

laying the pipeline with the one or more tensioners in the pipelaying mode;

interrupting pipelaying by engaging the hang off device with the launched pipeline;

transferring the weight of the launched pipeline to the hang off device;

severing the pipeline above the hang off device;

operating the one or more tensioners to the retracted mode;

positioning the accessory in the firing line;

connecting the accessory to the end of the launched pipeline supported by the hang off device and to the A&R system;

engaging the accessory on the auxiliary trolley;

releasing the hang off device from the launched pipeline; and operating the A&R winch to lower the accessory and the pipeline by the A&R system, the accessory being engaged on the auxiliary trolley.

18. The marine reel lay method according to claim 16, further comprising the steps of:

laying the pipeline with the one or more tensioners in the pipelaying mode;

positioning an end connector in the firing line;

interrupting pipelaying by engaging the hang off device with the launched pipeline;

transferring the weight of the launched pipeline to the hang off device;

operating the one or more tensioners to the retracted mode;

connecting the end connector to the A&R system;

displacing a retractable trolley rail part into the active position;

engaging the accessory on the auxiliary trolley;

releasing the hang off device from the launched pipeline;

operating the A&R winch to lower the end connector and the pipeline by the A&R system, the end connector being engaged on the auxiliary trolley.

19. The marine reel lay method to according to claim 16, further comprising the step of connecting the auxiliary trolley to the A&R system, connecting the accessory to the auxiliary trolley, and lowering the accessory and the pipeline by the A&R system, being supported by the auxiliary trolley.

20. The marine reel lay method according to claim 16, further comprising the steps of:

providing the one or more tensioners in the pipelaying mode and in an upper pipelaying position where the one or more tensioners at least partially overlap an end connector entry position;

laying the pipeline;

operating the one or more tensioners to the retracted mode;

translating the one or more tensioners to a lower parking position wherein the one or more tensioners have moved below the end connector entry position;

displacing a retractable trolley rail part to the active position, wherein the auxiliary trolley is positioned to engage on the end connector in the firing line; and lowering the end connector.

* * * * *